(12) United States Patent
Nishida

(10) Patent No.: US 10,048,062 B2
(45) Date of Patent: Aug. 14, 2018

(54) DISTANCE MEASURING APPARATUS AND DISTANCE MEASURING METHOD

(71) Applicant: THE CHUGOKU ELECTRIC POWER CO., INC., Hiroshima (JP)

(72) Inventor: Hidetaka Nishida, Hiroshima (JP)

(73) Assignee: THE CHUGOKU ELECTRIC POWER CO., INC., Hiroshima (JP)

(*) Notice: Subject to any disclaimer, the term of this patent is extended or adjusted under 35 U.S.C. 154(b) by 201 days.

(21) Appl. No.: 15/122,945

(22) PCT Filed: Mar. 12, 2014

(86) PCT No.: PCT/JP2014/056564
§ 371 (c)(1),
(2) Date: Sep. 1, 2016

(87) PCT Pub. No.: WO2015/136652
PCT Pub. Date: Sep. 17, 2015

(65) Prior Publication Data
US 2017/0074642 A1     Mar. 16, 2017

(51) Int. Cl.
*G01C 3/08* (2006.01)
*G01B 11/16* (2006.01)
(Continued)

(52) U.S. Cl.
CPC ........... *G01B 11/16* (2013.01); *G01B 5/0002* (2013.01); *G01B 11/14* (2013.01); *G01B 21/047* (2013.01);
(Continued)

(58) Field of Classification Search
CPC ...... G01B 11/16; G01B 5/0002; G01B 11/14; G01B 21/047; G01B 21/32; G01S 7/481; G01S 17/08; G01S 17/88; G01C 3/02
See application file for complete search history.

(56) References Cited

U.S. PATENT DOCUMENTS 4,823,590 A * 4/1989 Kniest .................. G01B 17/02
                                                   73/1.81
6,163,035 A * 12/2000 Shibayama ............ G01B 11/00
                                                   250/559.33
(Continued)

FOREIGN PATENT DOCUMENTS

JP    2001-235328 A    8/2001
JP    2005-055450 A    3/2005
(Continued)

OTHER PUBLICATIONS

Extended European Search Report issued in corresponding European Application No. 14885812.9 dated Feb. 24, 2017 (7 pages).
(Continued)

*Primary Examiner* — Samantha K Abraham
(74) *Attorney, Agent, or Firm* — Osha Liang LLP

(57) ABSTRACT

A distance measuring apparatus includes a reference member that is installed on a surface of a first metal member; a range finder that measures a distance to the reference member; and a mounting member to which the range finder is placed. The mounting member is installed on a surface of a second metal member coupled to the first metal member via a weld. One of the mounting member and the range finder includes first and second protruding parts. The other thereof includes first and second fitting holes into which the first and the second protruding parts are fit, respectively, such that the range finder is mounted to the mounting member, and first and second pressing members that press the first and second protruding parts from first and second directions toward inner side surfaces of the first and second fitting holes, respectively.

10 Claims, 10 Drawing Sheets

(51) Int. Cl.
*G01B 21/04* (2006.01)
*G01B 21/32* (2006.01)
*G01B 5/00* (2006.01)
*G01S 17/88* (2006.01)
*G01S 7/481* (2006.01)
*G01B 11/14* (2006.01)
*G01S 17/08* (2006.01)
*G01C 3/02* (2006.01)

(52) U.S. Cl.
CPC .............. *G01B 21/32* (2013.01); *G01S 7/481* (2013.01); *G01S 17/08* (2013.01); *G01S 17/88* (2013.01); *G01C 3/02* (2013.01)

(56) References Cited

U.S. PATENT DOCUMENTS

| | | | | |
|---|---|---|---|---|
| 9,680,975 | B2* | 6/2017 | Filiz | H04M 1/0266 |
| 2002/0040606 | A1* | 4/2002 | Chen | G01N 3/08 |
| | | | | 73/831 |
| 2011/0057646 | A1* | 3/2011 | Takatori | G01B 5/004 |
| | | | | 324/207.24 |
| 2011/0166737 | A1* | 7/2011 | Tanaka | G05D 1/0274 |
| | | | | 701/25 |
| 2011/0178668 | A1* | 7/2011 | Tanaka | G09B 29/106 |
| | | | | 701/25 |
| 2011/0178669 | A1* | 7/2011 | Tanaka | G05D 1/0272 |
| | | | | 701/25 |
| 2012/0056751 | A1* | 3/2012 | Field | E21B 7/022 |
| | | | | 340/854.6 |
| 2013/0319325 | A1* | 12/2013 | Whitfield | B23K 26/34 |
| | | | | 118/620 |
| 2015/0077909 | A1* | 3/2015 | Filiz | G06F 1/16 |
| | | | | 361/679.01 |

FOREIGN PATENT DOCUMENTS

| | | |
|---|---|---|
| JP | 2011-089936 A | 5/2011 |
| JP | 2012-202953 A | 10/2012 |
| JP | 5364860 B1 | 12/2013 |
| JP | 5426054 B1 | 2/2014 |

OTHER PUBLICATIONS

Office Action in corresponding Canadian Patent Application No. 2,941,433 dated Jun. 1, 2017 (4 pages).
International Search Report issued in corresponding application No. PCT/JP2014/056564 dated May 20, 2014 (2 pages).
International Preliminary Report on Patentability and translation of Written Opinion issued in corresponding International Application No. PCT/JP2014/056564 dated Sep. 22, 2016 (5 pages).

* cited by examiner

DISTANCE MEASURING APPARATUS AND DISTANCE MEASURING METHOD

TECHNICAL FIELD

The disclosure relates to a distance measuring apparatus and a distance measuring method.

BACKGROUND ART

Pipes used for a boiler and a turbine, which are provided to a thermal power plant and a factory, are exposed to a high-temperature environment. Thus, creep deformation, in which distortion becomes greater from a weld as the center, is easily caused as time passes. Therefore, such distortion in the pipes is regularly inspected, to predict the residual life of the pipes (see Patent Literature 1).

A method of inspecting such a pipe for distortion includes forming a metal thin film on a surface of the pipe in advance, and performing image analysis of the surface of the metal thin film as to its unevenness.

CITATION LIST

Patent Literature

[PTL 1] Japanese Patent Application Laid-open Publication No. 2012-202953

SUMMARY

However, the above method lacks versatility since an image analyzing device is expensive. Further, in this method, a part to be analyzed is such a small area having a radius of several centimeters. Thus, it is difficult to precisely predict the residual life without precisely specifying, in advance, a place where distortion is created.

Thus, embodiments of the present disclosure are directed to the provision of a new distance measuring apparatus and distance measuring method, which enable regular distortion detection.

One or more embodiments of the present disclosure are a distance measuring apparatus comprising:

a reference member configured to be installed on a surface of a first metal member;

a range finder configured to measure a distance to the reference member; and a mounting member to which the range finder is configured to be placed, the mounting member being configured to be installed on a surface of a second metal member, the second metal member being coupled to the first metal member via a weld, one of the mounting member and the range finder including first and second protruding parts, the other of the mounting member and the range finder including first and second fitting holes into which the first and the second protruding parts are configured to be fitted, respectively, such that the range finder is placed to the mounting member, a first pressing member configured to press the first protruding part from a first direction toward an inner side surface of the first fitting hole, and a second pressing member configured to press the second protruding part from a second direction toward an inner side surface of the second fitting hole, the second direction being different from the first direction.

Other features of embodiments of the present disclosure are clarified by the description of the present specification and accompanying drawings.

According to a distance measuring apparatus and a distance measuring method of embodiments of the present disclosure, it is made possible to periodically perform distortion detection of an area, in which metal members are welded to each other, where especially distortion is created readily.

DESCRIPTION

At least the following matters are made clear by the description of the present specification and accompanying drawings.

===Distance Measuring Apparatus===

A distance measuring apparatus according to one or more embodiments of the present disclosure will be described.

Figure 1A:
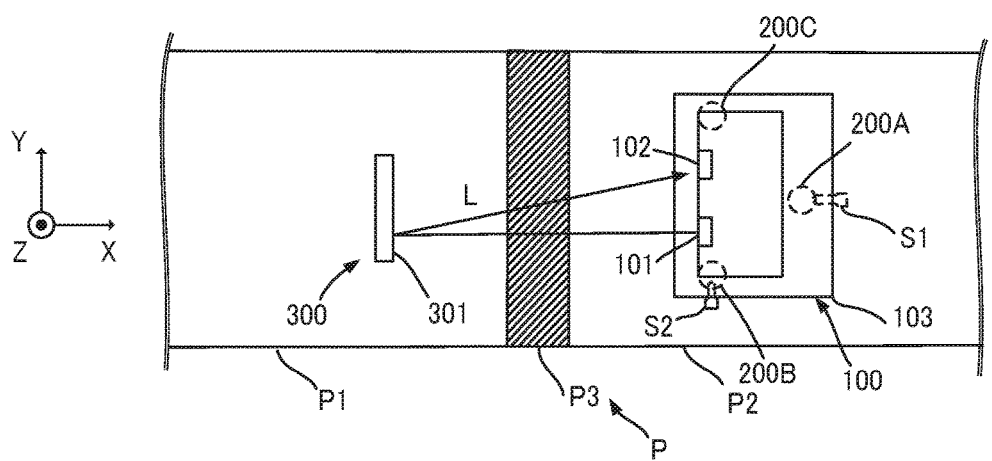
FIGS. 1A and 1B are diagrams illustrating a configuration of a distance measuring apparatus according to one or more embodiments of the present disclosure.
Figure 1B:
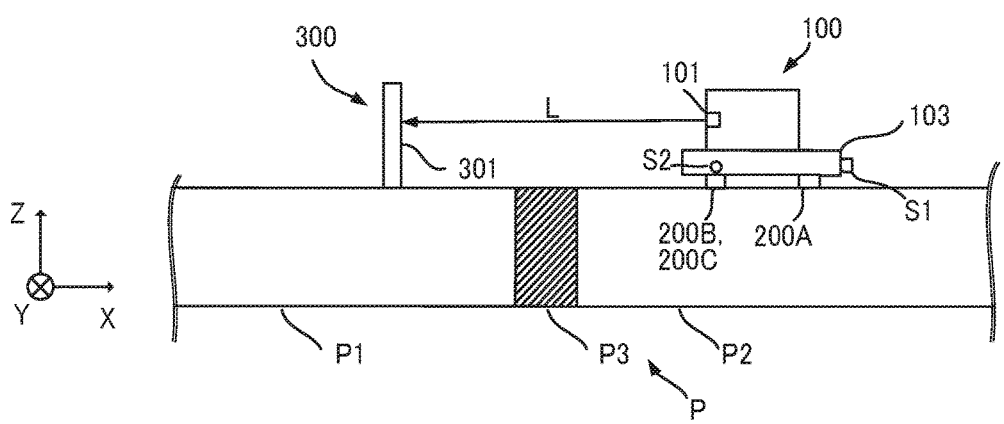

One configuration example of the distance measuring apparatus will be described with reference to FIGS. 1A, 1B, and 2. Note that FIG. 1A is a plan view of the distance measuring apparatus, and FIG. 1B is a side view of the distance measuring apparatus. Further, FIG. 2 is a perspective view before the distance measuring apparatus is placed.

Figure 2:
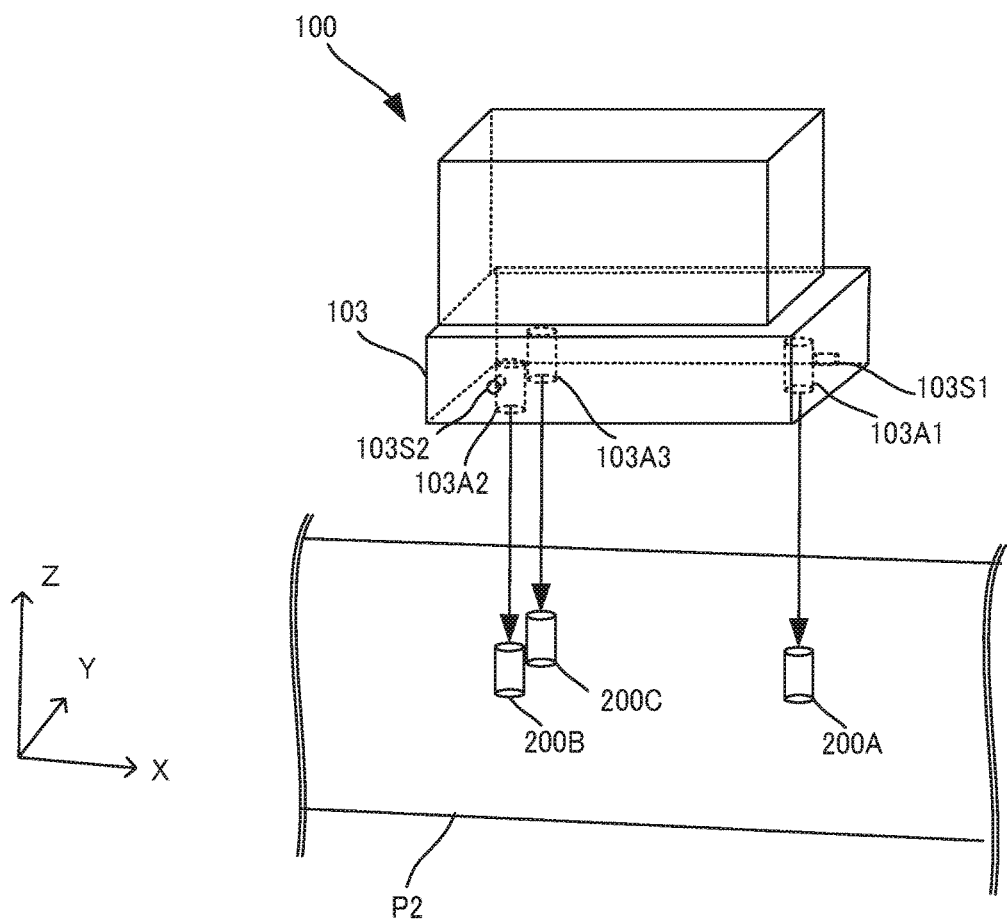
FIG. 2 is a diagram illustrating a configuration of a distance measuring apparatus according to one or more embodiments of the present disclosure.

In FIGS. 1A, 1B, and 2, a Z-axis is an axis along a height direction in which a laser range finder 100 is mounted (a direction substantially vertical to the surface of a pipe P), an X-axis is an axis in a longitudinal direction of the pipe P (pipe P1 and pipe P2), and a Y-axis is an axis orthogonal to the X-axis and the Z-axis. Note that, in the following description, they are simply referred to as an "X direction", a "Y direction", and a "Z direction", respectively, and a direction of an arrow indicates +direction while a direction opposite to the arrow indicates −direction. Further, a plane formed by the X-axis and the Y-axis is referred to as an "XY-plane", a plane formed by the X-axis and the Z-axis is referred to as an "XZ-plane", and a plane formed by the Y-axis and the Z-axis is referred to as a "YZ-plane".

The distance measuring apparatus according to one or more embodiments of the present disclosure comprises the laser range finder 100, a mounting member 200A, 200B, 200C, and a reflecting plate 300. The reflecting plate 300 is fixed to the surface of a first metal member (pipe P1), and the mounting member 200A, 200B, 200C is fixed to the surface of a second metal member (pipe P2) which is coupled via a weld P3 of the second metal member (pipe P2). The laser range finder 100 is configured to be placed to the mounting member 200A, 200B using pressing pins S1 and S2.

The weld formed by joining the metal members to each other is in such a state that a base material and a weld metal are mixed by being melted, and furthermore has been heat-affected when being welded, resulting in a state where creep deformation is easily caused. The pipe configured with a metal member also includes welds at a plurality of locations, and distortion created in these welds is greater than distortion created in other locations. Thus, in one or more embodiments of the present disclosure, the reference member (reflecting plate 300) is installed on the surface of the first metal member (pipe P1), and the mounting member 200A, 200B, 200C is installed on the surface of the second metal member (pipe P2) via the weld P3 formed between the first metal member (pipe P1) and the second metal member (pipe P2), so that distortion in the weld between the metal members is detected.

It should be noted that the pipe P according to one or more embodiments of the present disclosure is specifically a pipe, made of carbon steel, which is used for a boiler, a turbine, etc., provided in a thermal power plant, the pipe being in a cylindrical shape having a circular cross-section orthogonal to the X direction. Then, the pipe P is configured such that an opening at one end of the pipe P1 on one side is welded to be connected to an opening at one end of the pipe P2 on the other side, and the weld P3 is formed between the pipe P1 and the pipe P2.

Then, the mounting member 200A, 200B, 200C and the reflecting plate 300 are respectively fixed to the surface of the pipe P2 and the surface of the pipe 1 with the weld P3 therebetween. That is to say, the mounting member 200A, 200B, 200C and the reflecting plate 300 are fixed in advance to the surface of the pipe P with a predetermined space provided therebetween in the X direction, and are configured such that, when the weld P3 of the pipe P is distorted, a change in the distance between the reflecting plate 300 and the mounting member 200A, 200B, 200C is detected using the laser range finder 100, thereby detecting distortion in the X direction of the pipe P.

The mounting member 200A, 200B, 200C includes three protruding parts (hereinafter, referred to as "protruding parts 200A to 200C") extending in the +Z direction (substantially vertical to the surface of the pipe P), to which the laser range finder 100 can be mounted when detecting distortion, and each are a stainless steel cylindrical body having a substantially circular cross-section in the XY-plane. These protruding parts are fixed in advance to the surface of the pipe P2 before distortion occurs in the pipe P (weld P3). The three protruding parts are in such a positional relationship that three protruding parts form vertexes of a triangle when viewed in the XY-plane. Further, the protruding parts 200A to 200C are fixed to the pipe P2 by spot welding. Note that a method of placing the laser range finder 100 to the protruding parts 200A to 200C and positioning it with respect to the surface of the pipe P will be described later.

The reflecting plate 300 is a reference member in measuring a change in the distance to the protruding parts 200A to 200C. Specifically, the reflecting plate 300 is a stainless steel plate-like body fixed to the pipe P substantially vertically. Then, the reflecting plate 300 includes a light receiving area 301, which is a substantially flat mirror-finished area, configured to receive a laser beam emitted from the laser range finder 100 and reflect the laser beam. The reflecting plate 300 is fixed such that the light receiving area 301 is arranged extending in the +Z direction (substantially vertical to the surface of the pipe P). The reflecting plate 300 is arranged, at a location away in the X direction by a predetermined distance (e.g., about 1 m) from the protruding parts 200A to 200C, such that the light receiving area 301 faces the laser beam emitting direction in the laser range finder 100 that is mounted to the protruding parts 200A to 200C. Further, the reflecting plate 300 is fixed to the surface of the pipe P1 by spot welding.

The protruding parts 200A to 200C and the reflecting plate 300 are in such a positional relationship that, when the laser range finder 100 is placed to the protruding parts 200A to 200C, the laser beam from a light-emitting portion 101 of the laser range finder 100 is reflected by the light receiving area 301 of the reflecting plate 300, to be received by a light-receiving portion 102 of the laser range finder 100.

The laser range finder 100 has a housing that includes the light-emitting portion 101, the light-receiving portion 102, and a base portion 103. The base portion 103 is a plate-like body arranged at the bottom of the housing, and the light-emitting portion 101 and the light-receiving portion 102 are arranged, above the base portion 103, substantially at the same height and locations displaced in the Y direction to each other. The light-emitting portion 101 is arranged such that the direction in which the laser beam is emitted to the reflecting plate 300 is directed in the −X direction, and the light-receiving portion 102 is arranged in such a direction as to receive the laser beam from the −X direction.

Further, the laser range finder 100 is configured such that the protruding parts 200A to 200C are fitted into the base portion 103 and the pressing pins S1 and S2 are attached, thereby being positioned with respect to the surface of the emitting pipe P. Note that a method of placing the laser range finder 100 to the protruding parts 200A to 200C and positioning it to the surface of the pipe P will be described later.

In one or more embodiments of the present disclosure, the laser range finder 100 is configured to measure a distance to the reflecting plate 300, as follows.

The light-emitting portion 101 of the laser range finder 100 includes, for example, a modulated signal oscillator and a semiconductor light emitting element, and is configured to emit YAG laser beam intensity-modulated at a high-frequency. Further, the light-receiving portion 102 includes, for example, a photodetector and a phase meter, and is configured to measure a phase difference of modulated waves between the reflected laser beam and interior reference standard, to calculate a distance between the laser range finder 100 and the reflecting plate 300.

Specifically, in one or more embodiments of the present disclosure, the light-emitting portion 101 of the laser range finder 100 is configured to emit the laser beam toward the light receiving area 301 of the reflecting plate 300 from the +X direction to the −X direction (along a longitudinal direction), the light receiving area 301 is configured to reflect the laser beam from the −X direction to the +X direction (along the longitudinal direction), to reach the light-receiving portion 102. Then, the light-receiving portion 102 of the laser range finder 100 is configured to receive the reflected laser beam that is reflected by the reflecting plate 300, measure a phase difference of modulated waves between the reflected light and the interior reference standard, to calculate a distance between the laser range finder 100 and the reflecting plate 300 (phase difference method). Note that an arrow L in FIGS. 1A and 1B indicates a direction in which the laser beam is emitted from the laser range finder 100, and a direction in which the laser beam is reflected from the reflecting plate 300.

Here, the protruding parts 200A to 200C and the reflecting plate 300 are fixed to the surface of the pipe P with the predetermined space provided in advance therebetween in the X direction, as described above. Thus, in the case where distortion is created between the protruding parts 200A to 200C installed on the surface of the pipe P2 and the reflecting plate 300 installed on the surface of the pipe P1, especially in the weld P3, a space in the X direction between the reflecting plate 300 and the protruding parts 200A to 200C changes from the space at the initial time they are installed. Then, in one or more embodiments of the present disclosure, such distortion is detected by measuring a distance between the laser range finder 100 and the reflecting plate 300 in a state where the laser range finder 100 is precisely positioned onto the surface of the pipe P.

In the distance measuring apparatus according to one or more embodiments of the present disclosure, when distortion is detected, the laser range finder 100 is placed to the protruding parts 200A to 200C and distortion of the pipe P, especially in the weld P3 is detected by a change in the distance to the reflecting plate 300, as has been described.

===Preparatory Process===

Subsequently, an example of a preparatory process of fixing the protruding parts 200A to 200C and the reflecting plate 300 to the surface of the pipe P will be described with reference to FIGS. 3A and 3B.

Figure 3A:
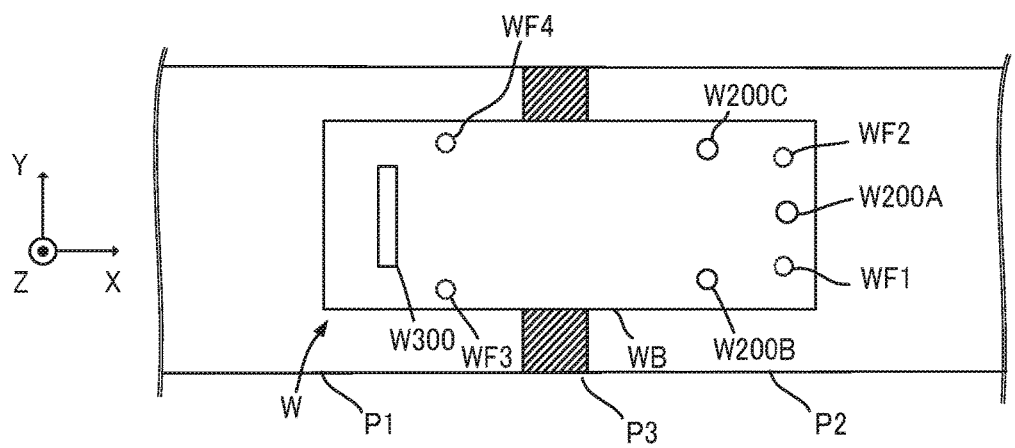
FIGS. 3A and 3B are diagrams illustrating a preparatory process according to one or more embodiments of the present disclosure.
Figure 3B:
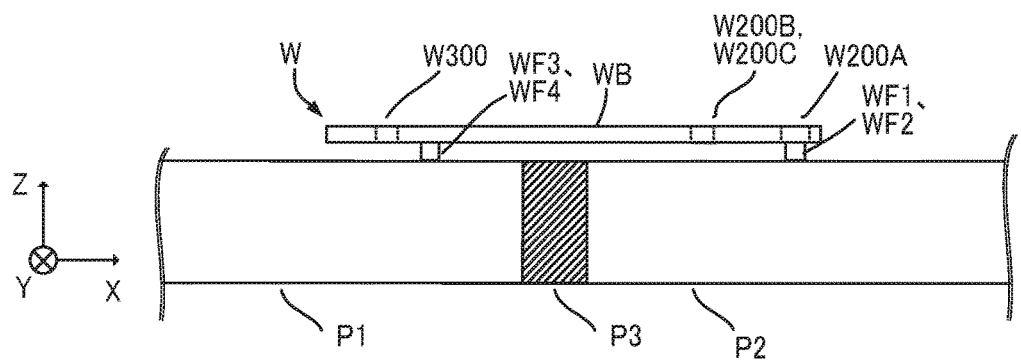

Note that FIG. 3A is a plan view of a state in which a plate member W, which is used in the preparatory process, is placed on the surface of the pipe P, and FIG. 3B is a side view of such a state.

The preparatory process according to one or more embodiments of the present disclosure is, as has been described, the process of fixing the protruding parts 200A to 200C and the reflecting plate 300 onto the surface of the pipe P with a predetermined space provided therebetween, before distortion is created in the weld P3. Such a fixing method is performed by spot welding using the plate member W having through holes into which the protruding parts 200A to 200C and the reflecting plate 300 can be inserted.

Specifically, the plate member W according to one or more embodiments of the present disclosure comprises a plate portion WB, four leg portions WF1, WF2, WF3, and WF4 which are disposed at the four corners of the bottom surface in the plate portion WB and extend substantially vertically (−Z direction), and four hole portions W300, W200A, W200B, and W200C penetrating the plate portion WB in the Z direction. Then, four leg portions WF1, WF2, WF3, and WF4 of the plate member W have substantially the same length in the Z direction, and are configured such that the plate member W can be stabilized when the plate member W is placed on the surface of the pipe P.

Further, the hole portion W300 formed in the plate portion WB is such a hole as to have a shape similar to the shape of the cross-section in the XY-plane of the reflecting plate 300 and the hole configured such that a member of the reflecting plate 300 can be inserted thereinto. Similarly, the hole portions W200A, W200B, and W200C formed in the plate portion WB are such holes as to have shapes similar to those of the cross-sections in the XY-plane of the protruding parts 200A to 200C and the holes configured such that members of the protruding parts 200A to 200C can be inserted thereinto, respectively. Then, the locations in the XY-plane of these four hole portions (W300, W200A, W200B, and W200C) are the same in positional relationship as the locations in the XY-plane of the reflecting plate 300 and the protruding parts 200A to 200C illustrated FIG. 1A when they are inserted into the hole portions. Note that "the same in the positional relationship as the locations in the XY-plane" indicates that, when a plurality of constituent elements are viewed in the XY-plane, the distances of the line segments connecting the constituent elements are the same and the angles forming among the line segments connecting the constituent elements re the same (hereinafter the same).

In this process, the plate member is placed on the surfaces of the pipe P1 and the pipe P2 in such a manner as to extend across the weld P3. Then, the members of the reflecting plate 300 and the protruding parts 200A to 200C are inserted into the four hole portions (W300, W200A, W200B, and W200C) in a state where the plate member W is placed on the surface of the pipe P, and they are installed substantially vertically (Z direction) on the surface of the pipe P, to be spot-welded to the surface of the pipe P, thereby being fixed to the surface of the pipe P.

As has been described above, in one or more embodiments of the present disclosure, with the use of the plate member W, the protruding parts 200A to 200C and the reflecting plate 300 are fixed to given locations on the surface of the pipe P so as to be in a predetermined positional relationship.

===Positioning Method===

Subsequently, an example will be described of a method of positioning the laser range finder 100 according to one or more embodiments of the present disclosure onto the surface of the pipe, with reference to FIGS. 4A to 4F and 5.

Figure 4A:
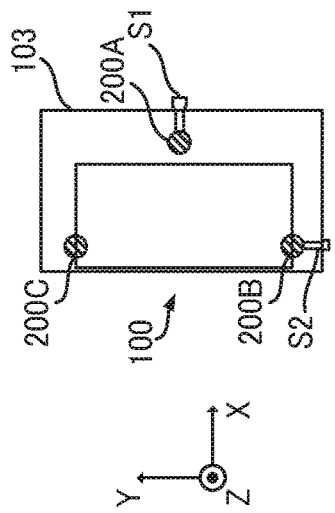
FIGS. 4A to 4F are diagrams illustrating a configuration of a laser range finder and a mounting member according to one or more embodiments of the present disclosure.
Figure 4C:
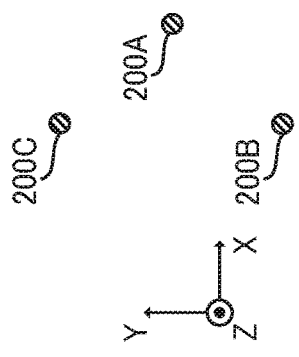
Figure 4E:
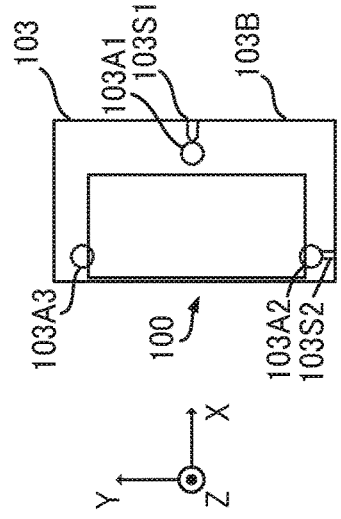
Figure 4B:
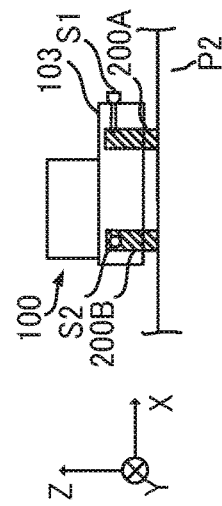
Figure 4D:
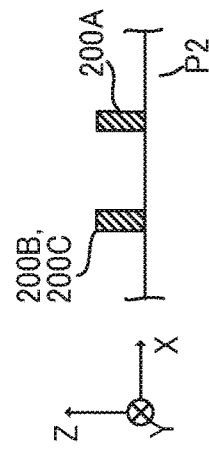
Figure 4F:
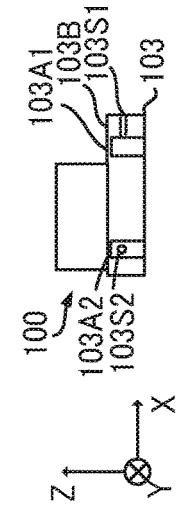
Figure 5:
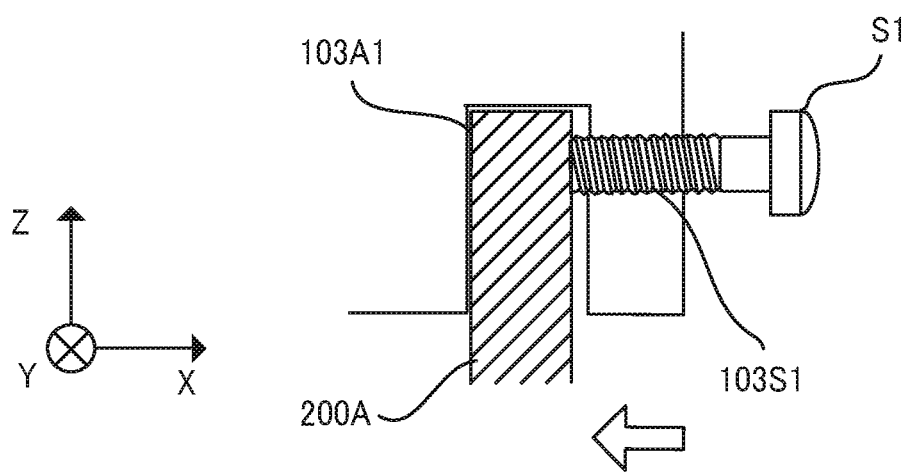
FIG. 5 is a diagram illustrating a configuration of a laser range finder and a mounting member according to one or more embodiments of the present disclosure.

Here, FIG. 4A is a plan view of a state when the laser range finder 100 is placed to the protruding parts 200A to 200C, and FIG. 4B is a side view of such a state. FIG. 4C is a plan view of the protruding parts 200A to 200C fixed to the surface of the pipe P, and FIG. 4D is a side view thereof. FIG. 4E is a plan view of the laser range finder 100 before being placed to the protruding parts 200A to 200C, and FIG. 4F is a side view thereof. Further, FIG. 5 is a diagram illustrating a method of positioning the laser range finder 100 to the surface of the pipe P, using the pressing pins S1 and S2.

The protruding parts 200A to 200C are configured with three cylindrical bodies extending substantially vertically (+Z direction) from the surface of the pipe P, as described above. Note that fixing the protruding parts 200A to 200C "substantially vertically" to the surface of the pipe P indicates extending in the +Z direction from the surface of the pipe P, but does not necessarily indicate forming an angle of 90 degrees relative to the surface of the pipe P.

The protruding parts 200A to 200C in a state of being fitted into the base portion 103 when viewed in the XY-plane are in such a positional relationship that the protruding parts 200A to 200C are respectively close to a side surface on the +Y side of the base portion 103 (on the side surface with respect to the side along the longitudinal direction), a side surface on the −Y side (opposite to the side surface on the +Y side with respect to the side along the longitudinal direction), and a side surface on the +X side (opposite to the side facing the reflecting plate 300).

The base portion 103 of the laser range finder 100 is a plate-like body of the bottom portion of the laser range finder 100, and can be fitted to the protruding parts 200A to 200C to locate the laser range finder 100 with respect to the surface of the pipe P.

Specifically, the base portion 103 comprises a base plate portion 103B, fitting holes 103A1, 103A2, and 103A3 (hereinafter, referred to as "fitting holes 103A1 to 103A3"), and communicating holes 103S1 and 103S2. The base plate portion 103B is a base, having a plate shape, that is arranged at the location of a bottom surface of the laser range finder 100, and is configured such that the fitting holes 103A1 to 103A3, to which the protruding parts 200A to 200C are configured to be inserted, are formed in the bottom surface of the base plate portion 103B, and the communicating holes 103S1 and 103S2, to which the pressing pins S1 and S2 are to be inserted, are formed in the side surfaces of the base plate portion 103B.

The fitting holes 103A1 to 103A3 are holes that are formed at the bottom surface of the base plate portion 103B in such a manner as to run from the −Z direction to the +Z direction, have substantially the same length in the Z direction, and do not penetrate the base plate portion 103B. The fitting holes 103A1 to 103A3 have cross-sections substantially the same as those in the XY-plane of the protruding parts 200A to 200C. Then, the fitting holes 103A1 to 103A3 are arranged such that those three holes in the XY-plane are substantially the same in the positional relationship as the protruding parts 200A to 200C in the XY-plane. With such a configuration, the protruding parts 200A to 200C can be fitted into the three fitting holes 103A1 to 103A3. Then, when the protruding parts 200A to 200C are fitted into the fitting holes 103A1 to 103A3, the base portion 103 and the light-emitting portion 101 and the light-receiving portion 102 provided above the base portion 103 are kept in a state horizontal to the surface of the pipe. That is, with such a configuration, the laser range finder 100 is controlled as to its movement in the Z direction with respect to the surface of the pipe P.

Further, the communicating holes 103S1 and 103S2 are through holes, having female screws, extending to fitting holes 103A1 and 103A2 that are formed on the side surfaces of the base plate portion 103B, respectively, such that the protruding parts 200A and 200B are partially exposed when the protruding parts 200A to 200C are fitted into the fitting holes 103A1 to 103A3, respectively. Specifically, the communicating hole 103S1 is a hole penetrating to the fitting hole 103A1 that is formed in the X direction on the side surface on the +X side (opposite to the side facing the reflecting plate 300) of the base plate portion 103B, such that the protruding part 200A is partially exposed. Similarly, the communicating hole 103S2 is a hole penetrating to the fitting hole 103A2 that is formed in the Y direction on the side surface on the −Y side (side surface with respect to the side along the longitudinal direction) of the base plate portion 103B, such that the protruding part 200B is partially exposed.

Further, the base portion 103 comprises the pressing pins S1 and S2. The communicating holes 103S1 and 103S2 and the pressing pins S1 and S2 configure pressing members that are configured to press the protruding parts 200A and 200B from the X direction and the Y direction toward the inner side surfaces of the fitting holes 103A1 and 103A2, respectively.

Specifically, the pressing pin S1 having a male screw is configured to press the protruding part 200A from the communicating hole 103S1, in a state where the protruding part 200A is fitted in the fitting hole 103A1. That is, when the pressing pin S1 is threadably engaged with the communicating hole 103S1, the pressing pin S1 is moved from the +X direction to the −X direction, to press the side surface of the protruding part 200A. Accordingly, the protruding part 200A relatively moves toward the side surface of the fitting hole 103A1. Then, a space in the X direction disappears between the side surface on the −X side of the protruding part 200A (opposite to the side facing the communicating hole 103S1) and the side surface along the side surface on the −X side of the protruding part 200A in the inner side surface of the fitting hole 103A1, as well as the side surface on the −X side of the protruding part 200A is pressed toward the inner side surface of the fitting hole 103A1 by the pressing pin S1. As a result, the movement of the laser range finder 100 in the X direction with respect to the surface of the pipe P is regulated. Note that FIG. 5 is an enlarged view illustrating that the protruding part 200A1 is pressed by the pressing pin S1 toward the inner side surface of the fitting hole 103A1 (an arrow in FIG. 5 indicates a direction in which the protruding part 200A1 relatively moves in the fitting hole 103A1).

Further, similarly, the pressing pin S2 having a male screw presses the protruding part 200B from the communicating hole 103S2, in a state where the protruding part 200B is fitted in the fitting hole 103A2, thereby regulating the movement the laser range finder 100 in the Y direction with respect to the surface of the pipe P. With such a configuration, the laser range finder 100 is controlled as to its movements in the X direction and the Y direction with respect to the surface of the pipe P.

In one or more embodiments of the present disclosure, as has been described, the two protruding parts 200A and 200B that are fitted in the fitting holes 103A1 and 103A2 are pressed from two different directions, thereby positioning the laser range finder 100 with respect to the surface of the pipe P. Further, since the mounting member comprises the three protruding parts 200A to 200C, the laser beam emitting direction of the laser range finder 100 is determined with respect to the horizontal direction of the surface of the pipe P, when the laser range finder 100 is mounted.

As has been described above, according to one or more embodiments of the present disclosure, the laser range finder 100 is configured to be detachable while being able to be precisely positioned with respect to the surface of the pipe P. Thus, even though such a measurement target as the pipe P according to one or more embodiments of the present disclosure is exposed to high temperature and used under such an environment that the laser range finder 100 cannot be permanently installed, regular distortion detection can be performed. One or more embodiments of the present disclosure are useful especially in detecting distortion in a weld between the metal members. Further, with the laser range finder 100, a measuring distance can be made longer, and thus, even if it is not possible to specify a place where distortion is easily created, distortion detection can be performed.

Further, in one or more embodiments of the present disclosure, the protruding parts 200A to 200C are fixed in a direction substantially vertical to the surface of the pipe P, while the movement is being regulated by the pressing pins S1 and S2 to be pressed from a horizontal direction with respect to the surface of the pipe P (XY-plane). Thus, precise positioning in the horizontal direction (XY-plane) with respect to the surface of the pipe P is can be performed.

Further, in one or more embodiments of the present disclosure, in the preparatory process, the reflecting plate 300 and the protruding parts 200A to 200C are fixed to the surface of the pipe P using the plate member W. Thus, the distance measuring apparatus can be mounted such that the protruding parts 200A to 200C and the reflecting plate 300 become in the predetermined positional relationship (such a positional relationship that, while the laser range finder 100 is placed to the protruding parts 200A to 200C, when the laser beam is emitted from the light-emitting portion 101 of the laser range finder 100, the laser beam is reflected by the light receiving area 301 of the reflecting plate 300, to reach the light-receiving portion 102). In addition, it is possible to omit a process of measuring the initial intervals between the protruding parts 200A to 200C and the reflecting plate 300, which is performed immediately after installing the protruding parts 200A to 200C and the reflecting plate 300.

Figure 6A:
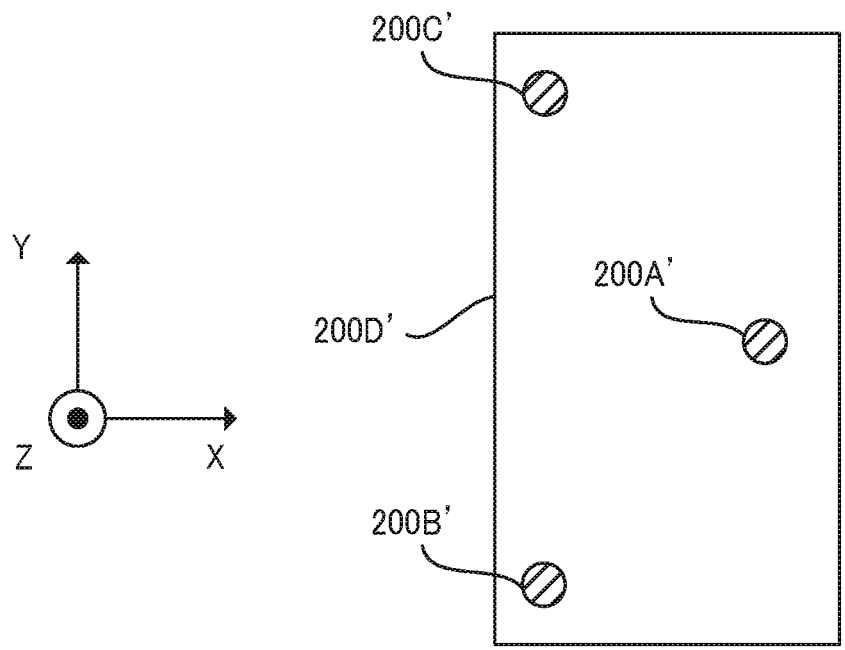
FIGS. 6A and 6B are diagrams illustrating a configuration of a mounting member according to one or more embodiments of the present disclosure.
Figure 6B:
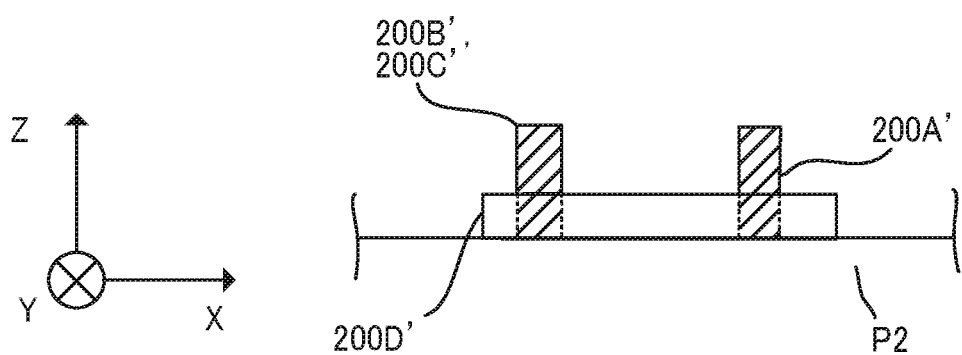
Figure 7:
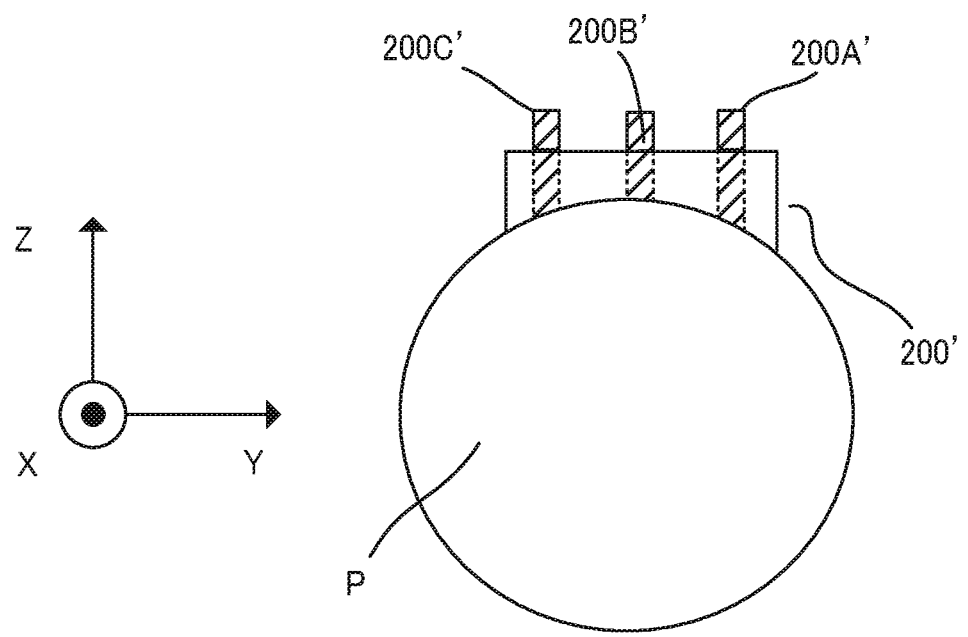
FIG. 7 is a diagram illustrating a configuration of a mounting member according to one or more embodiments of the present disclosure.

Note that, in one or more embodiments described above, the mounting member is configured with the protruding parts 200A to 200C, which are three cylindrical bodies of a uniform height in the Z direction. However, as long as the protruding parts are provided, various design changes are possible. Other embodiments of a mounting member are illustrated in FIGS. 6A, 6B, and 7. The mounting members illustrated in FIGS. 6A, 6B, and 7 are configured such that protruding parts 200A', 200B', and 200C' constituted by three cylindrical bodies are planted in a metal mount 200D'. That is, the mount 200D' has through holes, having female screws extending in the Z direction, formed at locations therein where the protruding parts 200A', 200B', and 200C' are to be installed. The protruding parts 200A', 200B', and 200C' having male screws are inserted into those through holes and threadably engaged therewith, thereby planting the protruding parts 200A', 200B', and 200C' in the mount 200D'. In the case where the mount 200D' is used, it is useful in that, even though the area in which the mounting member is to be fixed is in a curved shape, the bottom portion of the mounting member is formed into a shape along the curved upper surface of the pipe P, thereby being able to easily form a cylindrical shape in the direction (+Z direction) vertical to the longitudinal direction (X direction) of the pipe P where distortion is detected. Further, when the protruding parts 200A', 200B', and 200C' of the mounting member are fixed to the surface of the pipe P, it is also possible to weld the metal mount 200D' to the surface of the pipe P, and thereafter plant the protruding parts 200A', 200B', and 200C' in the holes of the mount, thereby being able to improve workability. In addition, shear stress can be relieved which is applied, in the horizontal direction (X direction, Y direction), to the place where the pipe P and the protruding parts 200A', 200B', and 200C' are fixed when the laser range finder 100 is mounted.

Further, the mounting member not necessarily comprises three protruding parts. As long as the member comprises two or more protruding parts, the orientation of the laser range finder with respect to the horizontal direction (XY direction) of the surface of the pipe P can be fixed when the mounting member is mounted into the fitting holes in the base portion. Further, the height and shape of the mounting member is not necessarily uniform, but is any given height and shape as long as the laser range finder is stabilized with respect to the surface of the pipe P when the laser range finder is fitted to the mounting member. For example, the height in the Z direction of the mounting member 200C is made greater than the height of the mounting member 200A, 200B according to one or more embodiments described above, thereby being able to facilitate the fitting work between the base portion 103 of the laser range finder 100 and the mounting member.

Further, the protruding parts 200A to 200C may be formed in shapes other than the cylindrical shape, as long as the shapes are capable of being fitted into the fitting holes 103A1 to 103A3.

Further, in one or more embodiments described above, female screws are provided in the communicating holes 103S1 and 103S2, and male screws are provided to the pressing pins S1 and S2. However, the structure of such screws is not necessary as long as the pressing pins S1 and S2 are secured in the communicating holes 103S1 and 103S2 by friction force when the pressing pins S1 and S2 are pushed into the communicating holes 103S1 and 103S. That is, similarly to the above, the pressing pin S1 is secured by the friction force between itself and the inner side surface of the communicating hole 103S1, with the pressing pin S1 pressing the side surface on the −X side of the protruding part 200A toward the inner side surface of the fitting hole 103A1. Also, the pressing pin S2 is secured by the friction force between itself and the inner side surface of the communicating hole 103S2 with the pressing pin S2 pressing the side surface on the +Y side of the protruding part 200B toward the inner side surface of the fitting hole 103A2. Thus, it is made possible to precisely position the laser range finder 100 with respect to the horizontal direction (XY-plane) relative to the surface of the pipe P.

Further, leaf springs may be used in place of the pressing pins S1 and S2. For example, the leaf spring is provided to the inner side surface of the fitting hole 103A1, as well as a groove configured to receive the leaf spring is provided to the side surface of the protruding part 200A. Then, when the protruding part 200A is fitted into the fitting hole 103A1, the leaf spring provided to the side surface of the fitting hole 200A is fitted into the groove configured to receive the leaf spring of the protruding part 200A. This causes the side surface on the −X side of the protruding part 200A to be pressed toward the inner side surface of the fitting hole 103A1. The protruding part 200B and the fitting hole 103A2 are also provided with similar configurations. Thus, it is made possible to precisely position the laser range finder 100 with respect to the horizontal direction (XY-plane) relative to the surface of the pipe P.

One or more embodiments of the present disclosure are different from one or more embodiments described above in that a mount having a hole portion of a tubular shape is used as a mounting member in place of the protruding part described in one or more embodiments. That is, contrary to the first embodiment, a fitting hole is provided to the mounting member, and a protruding part is provided to the base portion of the laser range finder. Note that descriptions of configurations that are similar to one or more embodiments described above are omitted.

Figure 8E:
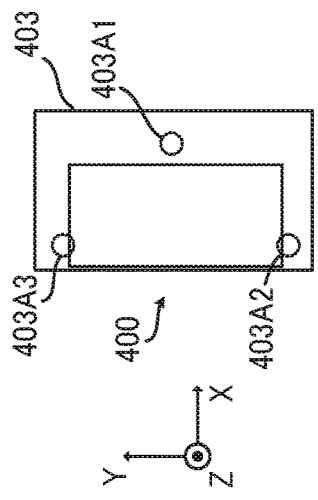
FIGS. 8A to 8F are diagrams illustrating a configuration of a laser range finder and a mounting member according to one or more embodiments of the present disclosure.
Figure 8F:
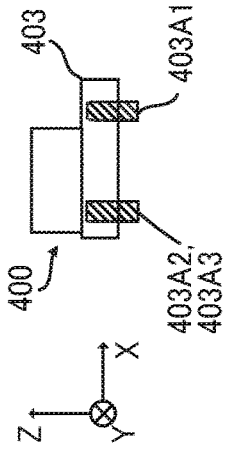
Figure 8C:
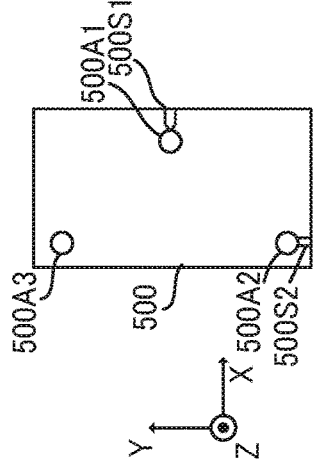
Figure 8D:
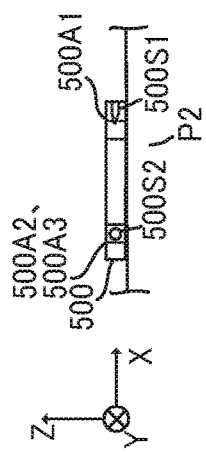
Figure 8A:
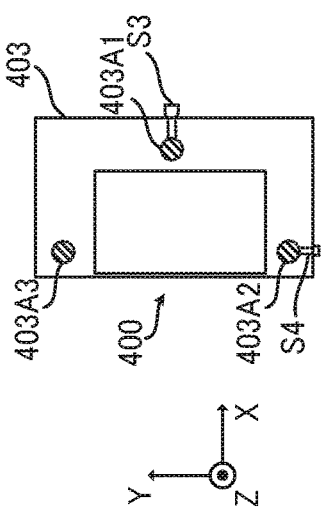
Figure 8B:
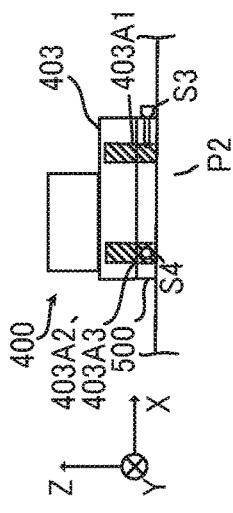

One configuration example of a mounting member 500 and a base 400 of the laser range finder according to one or more embodiments of the present disclosure will be described, with reference to FIGS. 8A to 8F. Here, FIG. 8A is a plan view in a state where the laser range finder 400 is placed to the mounting member 500, and FIG. 8B is a side view of such a state. FIG. 8C is a plan view of the mounting member 500 fixed to the surface of the pipe P, and FIG. 8D is a side view thereof. FIG. 8E is a plan view before the laser range finder 400 is placed to the mounting member, and FIG. 8F is a side view of such a state.

The mounting member 500 according to one or more embodiments of the present disclosure is a plate-like mount that is fixed to the surface of the pipe P by spot welding. Then, the mounting member 500 comprises fitting holes 500A1, 500A2, and 500A3 (hereinafter, referred to as "fitting holes 500A1 to 500A3"), which form holes extending in the −Z direction from the upper surface of the plate-like mount, and communicating holes 500S1 and 500S2, which form holes for introducing screws into the side surfaces of the plate-like mount, to mount the laser range finder 400.

The fitting holes 500A1 to 500A3 are three holes into which protruding parts 403A1, 403A2, and 403A3 (hereinafter, referred to as "protruding parts 403A1 to 403A3") of a base portion 403 of the laser range finder 400 are configured to be fitted, and also the holes extending in the −Z direction from the upper surface of the plate-like mount and having the same length in the Z direction (holes formed in a cylindrical shape in the Z direction). Then, the fitting holes 500A1 to 500A3 are arranged such that those three holes are substantially the same in the positional relationship in the XY-plane as the three cylindrical protruding parts 403A1 to 403A3.

The shapes of the cross-sections in the XY-plane of the fitting holes 500A1 to 500A3 are substantially the same as the shapes of the cross-sections in the XY-plane of the protruding parts 403A1 to 403A3 located at corresponding positions when the fitting holes 500A1 to 500A3 are fitted to the protruding parts 403A1 to 403A3, thereby being able to be fitted to the cylindrical protruding parts 403A1 to 403A3.

Further, the communicating holes 500S1 and 500S2 are formed on the side surfaces of the mounting member 500 such that the protruding parts 403A1 and 403A2 are exposed when the protruding parts 403A1 to 403A3 of the laser range finder 400 are fitted in the fitting holes 500A1 to 500A3. Specifically, the communicating hole 500S1 penetrates to the fitting hole 500A1 that is formed in the X direction on the side surface on the +X side (opposite to the side facing a reflecting plate 600) of the mounting member 500, such that the protruding part 403A1 is exposed when fitted. Similarly, the communicating hole 500S2 penetrates to the fitting hole 500A2 that is formed in the Y direction on the side surface on the −Y side (opposite to the side facing the reflecting plate 600) of the mounting member 500, such that the protruding part 403A2 is exposed when fitted.

Further, the base portion 403 of the laser range finder 400 according to one or more embodiments of the present disclosure is a plate-like body on the bottom portion of the laser range finder 400, and the base portion 403 is configured to be fitted to the mounting member 500 so as to be able to position the laser range finder 400 on the surface of the pipe P with the mounting member 500 being fitted thereto.

Specifically, the base portion 403 comprises a base plate portion 403B and the protruding parts 403A1 to 403A3. The base plate portion 403B is a plate-like base that is arranged at a bottom surface (−Z direction) position of the laser range finder 400, and the protruding parts 403A1 to 403A3, which are cylindrical bodies extending in the −Z direction, are arranged at the bottom portion of the base plate portion 403B.

As described above, the three protruding parts 403A1 to 403A3 are configured to be substantially the same in the positional relationship in the XY-plane as the three fitting holes 500A1 to 500A3, thereby being able to be fitted in the fitting holes 500A1 to 500A3. And, both the upper surface of the mounting member 500 and the bottom surface of the base plate portion 403B of the laser range finder 400 are in a flat shape, and when the mounting member 500 at corresponding position is fitted to the protruding parts 403A1 to 403A3, the base portion 403 and a light-emitting portion 401 and a light-receiving portion 402 (not shown) over the base portion 403 can be kept in a horizontal state with respect to the surface of the pipe P. That is, with such a configuration, the movement of the laser range finder 400 in the Z direction is regulated with respect to the surface of the pipe P.

Further, the mounting member 500 includes pressing pins S3 and S4, the communicating holes 500S1 and 500S2 and the pressing pins S3 and S4 configure pressing members which are configured to press the protruding parts 403A1 and 403A2 from the X direction or the Y direction toward the inner side surfaces of the fitting holes 500A1 and 500A2. A pressing method is similar to that in one or more embodiments described above.

Specifically, the pressing pin S3 having a male screw presses the protruding part 403A1 from the communicating hole 500S1, with the protruding part 403A1 being fitted in the fitting hole 500A1. That is, when the pressing pin S3 is threadably engaged with the communicating hole 500S1, the pressing pin S3 moves from the +X direction to the −X direction, to press the side surface of the protruding part 403A1. Thereby, the protruding part 403A1 is relatively moved toward the side surface of the fitting hole 500A1. Then, a space in the X direction disappears between the side surface on the −X side (opposite to the side facing the communicating hole 500S1) of the protruding part 403A1 and the side surface, along the side surface on the −X side of the protruding part 403A1, in the inner side surface of the fitting hole 500A1, as well as the side surface on the −X side of the protruding part 403A1 is pressed toward the inner side surface of the fitting hole 500A1 by the pressing pin S3. As a result, the movement of the laser range finder 400 in the X direction is restricted with respect to the surface of the pipe P. Similarly, the pressing pin S4 having a male screw presses the protruding part 403A2 from the communicating hole 500S2, with the protruding part 403A2 being fitted in the fitting hole 500A2, thereby restricting the movement of the laser range finder 400 in the Y direction with respect to the surface of the pipe P. With such a configuration, the laser range finder 400 is regulated as to its movements in the X direction and the Y direction relative to the surface of the pipe P.

That is, with such a configuration, the laser range finder 400 is controlled as to its movements in the X direction and the Y direction with respect to the surface of the pipe P.

In one or more embodiments of the present disclosure, as has been described, the two protruding parts 403A1 and 403A2 that are fitted in the fitting holes 500A1 and 500A2 are pressed from two different directions, thereby positioning the laser range finder 400 with respect to the surface of the pipe P. Further, since the mounting member 500 includes three cylindrical holes (fitting holes 500A1 to 500A3), the laser beam emitting direction of the laser range finder 400 is determined with respect to the horizontal direction of the surface of the pipe P, when the laser range finder 400 is mounted.

===Preparatory Process===

Subsequently, an example of a preparatory process of fixing the mounting member 500 and the reflecting plate 600 to the pipe P will be described with reference to FIGS. 9A and 9B.

Figure 9A:
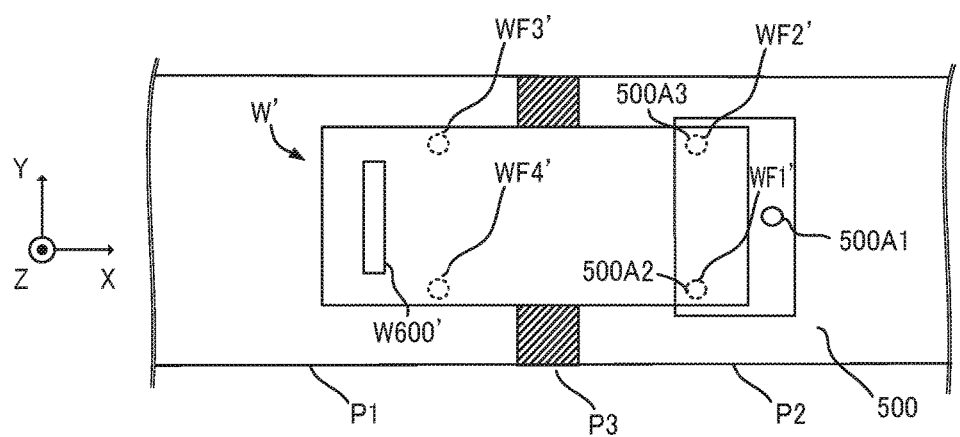
FIGS. 9A and 9B are diagrams illustrating a preparatory process according to one or more embodiments of the present disclosure.
Figure 9B:
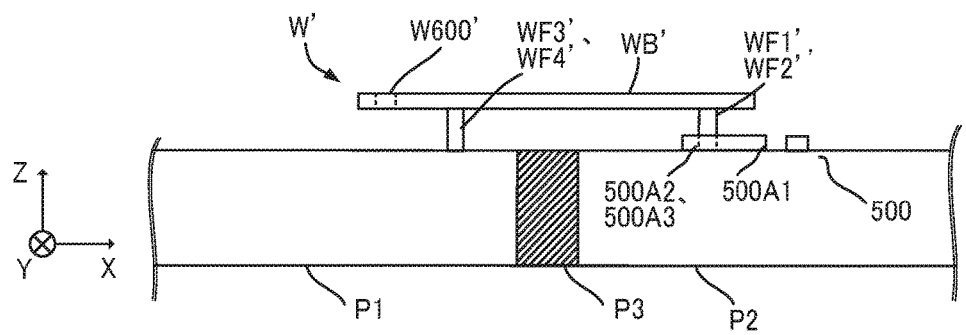

Note that FIG. 9A is a plan view of a state in which a plate member W', which is used in the preparatory process, is placed on the surface of the pipe P, and FIG. 9B is a side view of such a state.

The preparatory process according to one or more embodiments of the present disclosure is, similarly to one or more embodiments described above the process of fixing the mounting member 500 and the reflecting plate 600, by spot welding, to the surface of the pipe P with a predetermined space provided therebetween, before distortion is created in the surface of the pipe P. However, one or more embodiments of the present disclosure are different from one or more embodiments described above n that the reflecting plate 600 is fixed to the surface of the pipe P after the mounting member 500 is fixed thereto. Specifically, the preparatory process according to one or more embodiments of the present disclosure is performed by a first process of placing the plate-like mounting member 500 on the surface of the pipe P2 and a second process of placing the plate member W' on the surfaces of the pipe P1 and the pipe P2 in such a manner as to extend across the weld P3, with legs WF1' and WF2' of the plate member W' being fitted into the fitting holes 500A1 and 500A2 of the placed mounting member 500, and fixing the reflecting plate 600 using the plate member W'.

In the first process, the mounting member 500 is fixed to the surface of the pipe P2 without using the plate member W'. Spot welding is used as a fixing method at this time, similarly to one or more embodiments described above.

Then, in the second process, the plate member W' is used to carry out fixing such that the mounting member 500 and the reflecting plate 600 become in a predetermined positional relationship.

Here, the plate member W' comprises a plate portion WB', four leg portions WF1', F2', WF3', and WF4', which extends substantially vertically (−Z direction) and are arranged at the four corners of the bottom surface of the plate portion WB', and a hole portion W600' penetrating the plate portion WB', into which the reflecting plate 600 is inserted. Then, the four leg portions WF1', WF2', WF3', and WF4' of the plate member W' each are a cylindrical body having a substantially circular cross-section in the XY-plane. The leg portions WF1' and WF2' are configured to be fitted into the fitting holes 500A1 and 500A2 of the mounting member 500. Further, the leg portions WF1' and WF2' are the same in the positional relationship in the XY-plane as the fitting holes 500A1 and 500A2 in the mounting member 500.

Accordingly, when the plate member W' is placed (mounted) on the surface of the pipe P, the plate portion WB' becomes horizontal relative to the surface of the pipe P, with the leg portions WF1' and WF2' being fitted in the fitting holes 500A1 and 500A2 of the mounting member 500. Then, the hole portion W600' formed in the plate portion WB is a hole which has a shape similar to the shape of the cross-section in the XY-plane of the reflecting plate 600 and which is configured so that a member of the reflecting plate 600 can be inserted thereinto. Note that the leg portions WF1' and WF2' and the hole portion W600' of the plate member W' are configured to be the same in the positional relationship in the XY-plane as the fitting holes 500A1 and 500A2 and the reflecting plate 600.

Then, in a state where the plate member W' is placed on the surface of the pipe P, the member of the reflecting plate 600 is inserted into the hole portion W600', to be arranged substantially vertically (Z direction) on the surface of the pipe P1, and is spot-welded to the surface of the pipe P1, to be fixed to the surface of the pipe P1.

According to such a configuration described above in one or more embodiments of the present disclosure, the mounting member 500 and the reflecting plate 600 are fixed in such a positional relationship as illustrated in FIGS. 8A to 8F.

Hereinabove, with one or more embodiments of the present disclosure, it is made possible to configure the laser range finder 400 to be detachable, as well as precisely position the laser range finder 400 with respect to the surface of the pipe P, thereby being able to achieve an effect similar to that in one or more embodiments described above.

Note that, in one or more embodiments described above, the mounting member 500 comprises three tubular holes. However, the mounting member 500 not necessarily comprises three tubular holes. As long as the mounting member 500 comprises two or more tubular holes are provided, the orientation of the laser range finder 400 relative to the horizontal direction (XY direction) with respect to the surface of the pipe P can be fixed when the mounting member 500 is fitted into the protruding part 403A of the base portion 403.

One or more embodiments of the present disclosure are different from one or more embodiments described above in that a second mounting member 910, to which the reflecting plate 900 can detachably be mounted, is fixed to the surface of the pipe P in advance, in place of one or more such embodiments that a reflecting plate 900 is fixed to the surface of the pipe P in advance. Note that description of a configuration similar to that in one or more embodiments described above is omitted.

Figure 10A:
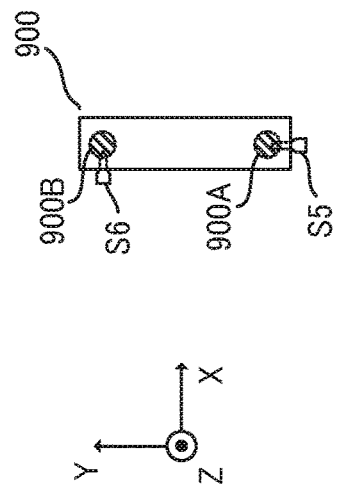
FIGS. 10A to 10F are diagrams illustrating a configuration of a distance measuring apparatus according to one or more embodiments of the present disclosure.
Figure 10B:
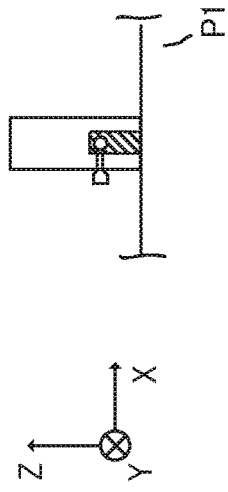
Figure 10C:
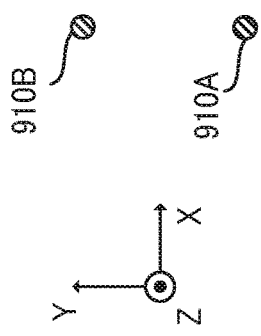
Figure 10D:
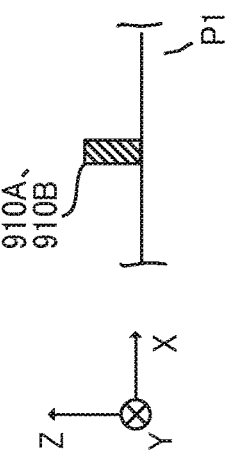
Figure 10E:
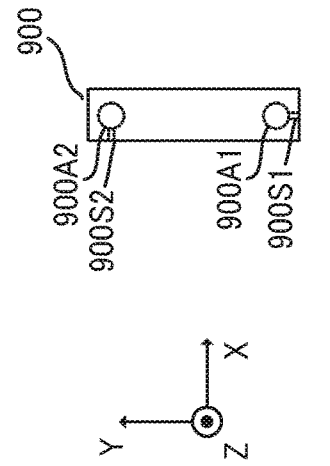
Figure 10F:
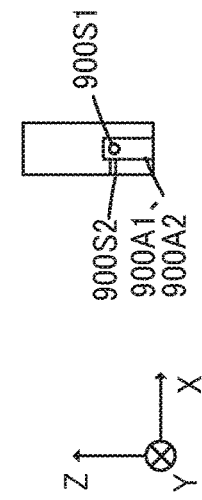

One configuration example of a second mounting member 910A, 910B and the reflecting plate 900 according to one or more embodiments of the present disclosure will be described with reference to FIGS. 10A to 10F. Here, FIG. 10A is a plan view of a state when the reflecting plate 900 is mounted to the second mounting member 910A, 910B, and FIG. 10B is a side view of such a state. FIG. 10C is a plan view of the second mounting member 910A, 910B that is fixed to the surface of the pipe P in advance, and FIG. 10D is a side view thereof. FIG. 10E is a plan view of the reflecting plate 900, and FIG. 10F is a side view thereof.

In one or more embodiments of the present disclosure, the second mounting member 910A, 910B is fixed to the surface of the pipe P, in advance, as a reference member, and the reflecting plate 900 is mounted to the second mounting member 910A, 910B when distortion is detected.

The second mounting member 910A, 910B includes two protruding parts 910A and 910B extending in the +Z direction (substantially vertical to the surface of the pipe P), to which the reflecting plate 900 can be mounted when distortion is detected, and each of the parts is a stainless steel cylindrical body having a substantially circular cross section in the XY-plane. These protruding parts are fixed, by spot welding, to the surface of the pipe P in advance, before distortion is created in the pipe P (weld P3). Then, such two protruding parts are arranged at positions displaced in the Y direction having substantially the same X coordinate.

Further, the reflecting plate 900 comprises reflecting plate fitting holes 900A1 and 900A2, communicating holes 900S1 and 900S2, and a light receiving area 901 (not shown). Note that the configuration of the light receiving area 901 is similar to that in one or more embodiments described above.

The reflecting plate fitting holes 900A1 and 900A2 are formed in the bottom surface of the reflecting plate 900 from the −Z direction to the +Z direction and do not penetrate the reflecting plate 900. The reflecting plate fitting holes 900A1 and 900A2 have substantially the same cross-sections as the cross-sections in the XY-plane of the protruding parts 910A and 910B, respectively. Further, the protruding parts 910A and 910B are the same in the positional relationship in the XY-plane as the reflecting plate fitting holes 900A1 and 900A2.

Accordingly, the protruding parts 910A and 910B are configured to be able to be fitted into the reflecting plate fitting holes 900A1 and 900A2.

Further, the communicating holes 900S1, S2 have female screws formed therein to penetrate to the reflecting plate fitting holes 900A1 and 900A2, and are formed on the side surfaces of the reflecting plate 900 such that protruding parts 910 become exposed when the reflecting plate 900 is fitted thereinto. Specifically, the communicating hole 900S1 penetrates to the reflecting plate fitting hole 900A1 that is formed in the Y direction on the side surface on the −Y side (the side surface of the surface formed along the longitudinal direction of the pipe P) of the reflecting plate 900, such that the protruding parts 910A and 910B are exposed when the reflecting plate 900 is fitted to the second mounting member 910A, 910B. Similarly, a communicating hole 910S2 is a through hole penetrating to the fitting hole 900A2 that is formed in the X direction on the side surface on the −X side (opposite to the side surface facing the mounting member) of the reflecting plate 900, such that the protruding part 910B is exposed when the reflecting plate 900 is fitted to the second mounting member 910A, 910B.

Then, a pressing pin S5 having a male screw is inserted from the communicating hole 910A1, in a state where the protruding part 910A is fitted in the reflecting plate fitting hole 900A1, thereby pressing the protruding part 910 A, so that the movement of the reflecting plate 900 in the Y direction is regulated with respect to the surface of the pipe P. Further, a pressing pin S6 having a male screw is inserted from the communicating hole 910A2, in a state where the protruding part 910B is fitted in the reflecting plate fitting hole 900A2, thereby pressing the protruding part 910 B, so that the movement of the reflecting plate 900 in the X direction is regulated with respect to the surface of the pipe. This fixing method is similar to that in one or more embodiments described above. With such a configuration, the reflecting plate 900 is controlled as to its movement in the X direction and the Y direction with respect to the surface of the pipe P.

Note that a configuration of the laser range finder and the mounting member according to one or more embodiments of the present disclosure are similar to a configuration of the laser range finder 100 and the mounting member 200 according to one or more embodiments described above (not shown).

According to configurations described above in one or more embodiments of the present disclosure, the reflecting plate 900 is positioned in the X direction, the Y direction, and the Z direction, with respect to the surface of the pipe P. Further, the second mounting member 910A, 910B comprises two protruding parts. Thus, when the reflecting plate 900 is mounted, the orientation in which the light receiving area 901 of the reflecting plate 900 faces is determined with respect to the horizontal direction of the surface of the pipe P.

Hereinabove, according to one or more embodiments of the present disclosure, not only the laser range finder but also the reflecting plate can be placed when performing measurement, thereby enabling space-saving in the height direction. Further, even in a case where a distance measuring apparatus is mounted at many places, the number of reflecting plates can be reduced.

The above embodiments describe such a case that a laser range finder is used as a range finder, however, other range finders may be used, as long as a range finder is one configured to measure a distance to a reference member (corresponding to the reflecting plate in one or more embodiments described above). For example, an ultrasonic range finder can be used in place of the laser range finder. In the case of the ultrasonic range finder, a distance from the range finder to the reference member can be measured by outputting ultrasonic waves toward the reflecting plate and measuring a time period that elapses before the ultrasonic waves are reflected back to the range finder.

Further, a capacitance type distortion sensor may be used in place of a laser range finder. In this case, a first electrode member is fixed to the surface of the pipe P1, and a second electrode member is fixed to the surface of the pipe P2 so as to be able to move independently of the first electrode member. And, a distance between the first electrode member and the second electrode member can be measured by a change in capacitance of a capacitor that is configured with a first electrode of the first electrode member and a second electrode of the second electrode member (see Japanese patent application laid-open publication No. 2012-202953 with respect to a measurement method). That is, as described in one or more above embodiments, when a distance is measured, each mounting member may be mounted at locations at which the first and the second electrode members are to be installed, and then the first and the second electrode members may be placed thereto. Note that, in this case, the first and the second electrode members configure a range finder.

Further, in one or more embodiments described above, a distance measuring apparatus is used to detect distortion in the weld P3 between the pipe P1 and the pipe P2 as one example of a part at which the first metal member and the second metal member are weld and coupled. In the case of a pipe, creep deformation is caused easily in the longitudinal direction via the weld P3, and such creep deformation can be detected as distortion of the surface thereof, and thus it is especially useful. However, the distance measuring apparatus and the distance measuring method according to one or more embodiments of the present disclosure can be applied not only to a pipe but to given metal members. Further, they may be applied to other members as long as creep deformation is easily caused in the members.

Further, in the preparatory process in one or more embodiments described above, the plate member, with which a predetermined space is to be formed between the reflecting plate and the mounting member, is used to secure them on the surface of the pipe. However, the above described plate member is not necessarily used, but a distance therebetween may be measured using the laser range finder after the reflecting plate and the mounting member are fixed to the surface of the pipe.

From above, one or more embodiments as above can be described as follows.

One or more embodiments described above disclose a distance measuring apparatus comprising:

the reflecting plate 300, 600 (or the second mounting member 910A, 910B) configured to be installed on the surface of the pipe P2;

the laser range finder 100, 400 configured to measure a distance to the reflecting plate 300, 600 (or the second mounting member 910A, 910B);

the mounting member 200, 200', 500 to which the laser range finder 100, 400 is configured to be placed, the mounting member 200, 200', 500 being configured to be installed on the surface of the pipe P1, the pipe P1 being coupled to the pipe P2 via the weld P3, one of the mounting member 200, 200', 500 and the laser range finder 100, 400 including the first and the second protruding parts 200A and 200B, 403A and 403B, the other of the mounting member 200, 200', 500 and the laser range finder 100, 400 including the first and the second fitting holes 103A and 103B, 500A and 500B into which the first and the second protruding parts 200A and 200B, 403A and 403B are configured to be fitted, respectively, such that the laser range finder 100, 400 is placed to the mounting member 200, 200', 500, a first pressing member configured to press the first protruding part 200A, 403A from the X direction toward the inner side surface of the first fitting hole 103A, 500A, and a second pressing member configured to press the second protruding part 200B, 403B from the Y direction toward the inner side surface of the second fitting hole 103B, 500B, the Y direction being different from the X direction.

Accordingly, it is made possible to configure the range finder to be detachable (demountable) as well as precisely position (locate) the range finder with respect to the surface of an object, thereby being able to preform regular distortion detection, with respect to a measurement target that is to be used in such an environment that a range finder cannot permanently be installed.

Here, the mounting member 200, 200' may include the first and the second protruding parts 200A and 200B, the laser range finder 100 may include the first and the second fitting holes 103A and 103B and the first and the second pressing members, the first pressing member may include the first communicating hole 103S1 communicating with the inner side surface of the first fitting hole 103A and a first pressing pin S1 configured to press the first protruding part 200A through the first communicating hole 103S1, and the second pressing member may include the second communicating hole 103S2 communicating with the inner side surface of the second fitting hole 103B, and the second pressing pin S2 configured to press the second protruding part 200B through the second communicating hole 103S2.

Accordingly, the range finder is configured to be detachable as well as can precisely be positioned with respect to the surface of an object.

Here, the first and the second communicating holes 103S1 and 103S2 may include female screws, respectively, and the first and the second the pressing pins S1 and S2 may include male screws configured to be threadably engaged with the first and the second female screws, respectively.

Here, the mounting member 200' may be the metal mount 200D' in which the first and the second protruding parts 200A', 200B' are planted, the metal mount being welded to the pipe P1.

In the case where the mount is used as above, even if the mounting member is fixed to an area in a curved shape, it is useful in that the bottom portion of the mounting member is formed along the curved shape, thereby easily forming a cylindrical shape in a vertical direction (+Z direction) relative to the surface of the metal member. Further, when the protruding part of the mounting member is fixed to the surface of the metal member, the protruding part may be planted into the through hole of the mount after the metal mount is welded to the surface of the metal member, which can improve workability. In addition, shear stress at the time of mounting of the range finder can be relieved, which is to be applied in the horizontal direction (X direction, Y direction) with respect to the place where the protruding part and the surface of the metal member are fixed.

Here, the reference member may be the reflecting plate 300, 600 configured to reflect a laser beam, and the laser range finder 100, 400 may be configured to emit the laser beam to the reflecting plate, and measure the distance based on the laser beam reflected from the reflecting plate.

Accordingly, the laser range finder can measure a long distance, and thus, even when it is impossible to specify a place where distortion is easily created, distortion detection can be performed.

Here, the first metal member on which the reflecting plate 300, 600, 900 is installed may be the first pipe P1, the second metal member on which the mounting member 200, 200', 500 is installed may be the second the pipe P2, and an opening on one end of the first pipe may be coupled to an opening on one end of the second pipe via the weld P3.

In the case of a pipe as described above, creep deformation is easily created in the longitudinal direction via a weld, and such creep deformation can be detected as distortion of the surface thereof, which is especially useful.

The first and the second protruding parts 200A and 200B, 403A and 403B each may be a cylindrical body extending, from the surface of the pipe P1, in a direction substantially vertical thereto, and the X direction and the Y direction may be substantially horizontal with respect to the surface of the pipe P1.

Accordingly, the range finder is configured to be detachable, as well as can precisely be positioned with respect to the surface of an object.

Further, one or more embodiments described above disclose a distance measuring method comprising:

a first process of installing the reflecting plate 300, 600 (or the second mounting member 910A, 910B) on the surface of the pipe P2 and installing the mounting member 200, 200', 500, to which the laser range finder 100, 400 is to configured be placed, on the surface of the pipe P1, the pipe P1 being coupled to the pipe P2 via the weld P3, a second process of fitting the first protruding part 200A, 403A and the second protruding part 200B, 403B into the first fitting hole 103A, 500A and the second fitting hole 103B, 500B, respectively, the first protruding part 200A, 403A and the second protruding part 200B, 403B being included in one of the mounting member 200, 200', 500 and the laser range finder 100, 400, the first fitting hole 103A, 500A and the second fitting hole 103B, 500B being included in the other of the mounting member 200, 500 and the laser range finder 100, 400, a third process of pressing the first protruding part 200A, 403A from the X direction toward the inner side surface of the first fitting hole 103A, 500A using the first pressing member, and pressing the second protruding part 200B, 403B from the Y direction toward the inner side surface of the second fitting hole 103B, 500B using the second pressing member, such that the laser range finder 100, 400 is placed to the mounting member 200, 200', 500, the Y direction being different from the X direction, and a fourth process of measuring a distance from the laser range finder 100, 400 to the reflecting plate 300, 600 (or the second mounting member 910A, 910B), in a state where the laser range finder 100, 400 is placed to the mounting member 200, 200', 500.

Accordingly, the range finder is configured to be detachable as well as can precisely be positioned with respect to the surface of an object, thereby being able to preform regular distortion detection, with respect to a measurement target that is to be used in such an environment that a range finder cannot permanently be installed.

Here, the first process may include a fifth process of placing the plate member W onto the surfaces of the pipe P2 and the pipe P1 in such a manner as to extend across the weld P3 so that the reflecting plate 300 and the mounting member 200 including the first protruding part 200A and the second protruding part 200B are installed, and the plate member W may include a plurality of through holes into which the reflecting plate 300, the first protruding part 200A and the second protruding part 200B are configured to be fitted, the plurality of through holes being configured such that, when the reflecting plate 300, the first protruding part 200A and the second protruding part 200B are inserted into the through holes, the reflecting plate 300, the first protruding part 200A and the second protruding part 200B become in a predetermined positional relationship.

Accordingly, the distance measuring apparatus can be mounted such that the mounting member and the reference member become in a predetermined positional relationship. In addition, it is also possible to omit a process of measuring the initial space between the mounting member and the reference member, which is performed immediately after mounting the mounting member and the reference member.

Here, the mounting member 500 may include the first fitting hole 500A and the second fitting hole 500B, the plate member W' may be configured to be provided, the plate member W' including the first leg portion WF1' and the second leg portion WF2'configured to be fitted into the first fitting hole 500A and the second fitting hole 500B, respectively, and the through hole W600' into which the reflecting plate 600 is configured to be fitted, the first leg portion WF1', the second leg portion WF2', and the through hole W600' being arranged such that, when the first leg portion WF1' and the second leg portion WF2'are inserted into the first fitting hole 500A and the second fitting hole 500B of the mounting member 500, respectively, and the reflecting plate 600 is inserted into the through hole W600', the reflecting plate 600, the first fitting hole 500A and the second fitting hole 500B become in the predetermined positional relationship and the first process may include a fifth process of installing the mounting member 500 on the surface of the pipe P2, and a sixth process of placing the plate member W' on the surfaces of the pipe P2 and the pipe P1 in such a manner as to extend across the weld P3 so that the first leg portion WF1' and the second leg portion WF2' are fitted into the first fitting hole 500A and the second fitting hole 500B of the mounting member 500, respectively.

Accordingly, the distance measuring apparatus can be mounted such that the mounting member and the reference member are in a predetermined positional relationship. In addition, it is also possible to omit a process of measuring the initial space between the mounting member and the reference member, which is performed immediately after mounting the mounting member and the reference member.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 100, 400 . . . laser range finder
101, 401 . . . light-emitting portion
102, 402 . . . light-receiving portion
103, 403 . . . base portion
200, 500 . . . mounting member
300, 600, 900 . . . reflecting plate
P . . . pipe
W . . . plate member
S . . . pressing pin

The invention claimed is:

1. A distance measuring apparatus comprising:
a reference member that is installed on a surface of a first metal member;
a range finder that measures a distance to the reference member; and
a mounting member on which the range finder is placed, wherein
the mounting member is installed on a surface of a second metal member,
the second metal member is coupled to the first metal member via a weld,
one of the mounting member and the range finder includes first and second protruding parts, and
the other of the mounting member and the range finder includes:
first and second fitting holes into which the first and the second protruding parts are fit, respectively, such that the range finder is placed to the mounting member,
a first pressing member that presses the first protruding part from a first direction toward an inner side surface of the first fitting hole, and
a second pressing member that presses the second protruding part from a second direction toward an inner side surface of the second fitting hole.

2. The distance measuring apparatus according to claim 1, wherein
the mounting member includes the first and the second protruding parts,
the range finder includes the first and the second fitting holes and the first and the second pressing members,
the first pressing member includes:
a first communicating hole communicating with the inner side surface of the first fitting hole, and
a first pressing pin that presses the first protruding part through the first communicating hole, and
the second pressing member includes:
a second communicating hole communicating with the inner side surface of the second fitting hole, and
a second pressing pin that presses the second protruding part through the second communicating hole.

3. The distance measuring apparatus according to claim 2, wherein
the first and the second communicating holes include female screws, respectively, and
the first and the second pressing pins include male screws that are threadably engaged with the first and the second female screws, respectively.

4. The distance measuring apparatus according to claim 1, wherein the mounting member is a metal mount in which the first and the second protruding parts are planted, the metal mount being welded to the second metal member.

5. The distance measuring apparatus according to claim 1, wherein
the reference member is a reflecting plate that reflects a laser beam, and
the range finder emits the laser beam to the reflecting plate, and measure the distance based on the laser beam reflected from the reflecting plate.

6. The distance measuring apparatus according to claim 1, wherein
the first metal member is a first pipe,
the second metal member is a second pipe, and
an opening on one end of the first pipe is coupled to an opening on one end of the second pipe via the weld.

7. The distance measuring apparatus according to claim 1, wherein
the first and the second protruding parts each are a cylindrical body extending, from a surface of the second metal member, in a direction substantially vertical thereto, and
the first direction and the second direction are substantially horizontal with respect to the surface of the second metal member.

8. A distance measuring method comprising:
installing a reference member on a surface of a first metal member,
installing a mounting member, on which a range finder is placed, on a surface of a second metal member, wherein the second metal member is coupled to the first metal member via a weld,
fitting first and second protruding parts into first and second fitting holes, respectively, wherein the first and the second protruding parts are included in one of the mounting member and the range finder, and the first and the second fitting holes are included in the other of the mounting member and the range finder,
pressing the first protruding part from a first direction toward an inner side surface of the first fitting hole using a first pressing member,
placing the range finder to the mounting member by pressing the second protruding part from a second direction toward an inner side surface of the second fitting hole using a second pressing member, and
measuring a distance from the range finder to the reference member, in a state where the range finder is placed to the mounting member.

9. The distance measuring method according to claim 8, wherein
the installing of the reference member and the mounting member comprises placing a plate member onto the surfaces of the first and the second metal members in such a manner as to extend across the weld,
the plate member includes a plurality of through holes into which the reference member and the first and the second protruding parts are fit, and
the plurality of through holes are arranged such that, when the reference member and the first and the second protruding parts are inserted into the through holes, the reference member and the first and the second protruding parts have a predetermined positional relationship.

10. The distance measuring method according to claim 8, wherein
the mounting member includes the first and the second fitting holes,
the method further comprises:
placing a plate member on the surfaces of the first and the second metal members,
wherein
the plate member includes first and second leg portions that fit into the first and the second fitting holes, respectively, and a through hole into which the reference member is fit,
the first and the second leg portions and the through hole are arranged such that, when the first and the second leg portions are inserted into the first and the second fitting holes of the mounting member, respectively, and the reference member is inserted into the through hole, the reference member and the first and the second fitting holes have a predetermined positional relationship; and
the installing of the reference member and the mounting member comprises installing the mounting member on the surface of the first metal member, and
the plate member is placed on the surfaces of the first and the second metal members in such a manner as to extend across the weld and the first and the second leg portions are fitted into the first and the second fitting holes of the mounting member, respectively.

\* \* \* \* \*